Sept. 25, 1934.  A. L. KRONQUEST  1,975,009

PROCESS OF FREEZING FOOD PRODUCTS IN METAL CONTAINERS

Filed Feb. 4, 1931

Inventor
Alfred L. Kronquest
By Sturtevant Mason & Porter
Attorneys

Patented Sept. 25, 1934

1,975,009

UNITED STATES PATENT OFFICE 1,975,009

PROCESS OF FREEZING FOOD PRODUCTS IN METAL CONTAINERS

Alfred L. Kronquest, Syracuse, N. Y., assignor to Continental Can Company, Inc., New York, N. Y., a corporation of New York Application February 4, 1931, Serial No. 513,434

2 Claims. (Cl. 99—14)

The invention relates to new and useful improvements in a process of freezing food products in sealed metal containers.

An object of the invention is to provide a process wherein the sealed metal container may be subjected to a refrigerant without any resulting injury to the metal parts of the container or the decorated or lithographed surfaces of the container.

A further object of the invention is to provide a process of the above character wherein a volatile refrigerant may be used which may be quickly removed from the container after the freezing process by evaporation.

In the drawing—

Figure 1:
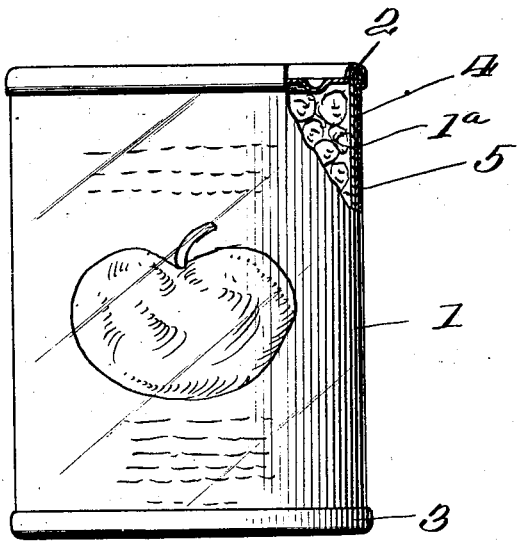
Figure 1 is a side view of a container with the protecting coating thereon preparatory to the passing of the container through the refrigerant for freezing the food product in the container.
Figure 2:
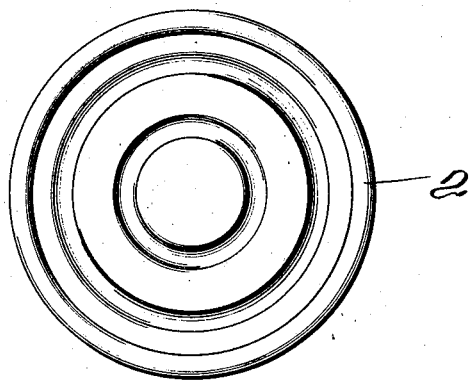
Fig. 2 is a top view thereof.
Figure 3:
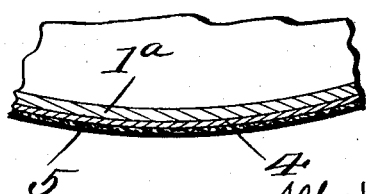
Fig. 3 is a sectional view through the body wall of the container on a line parallel with the end of the container, and showing on an exaggerated scale the coating on the container.

The invention is directed to a process of freezing food products in sealed metal containers wherein a volatile refrigerant is used and the container is protected from any injurious attack by the refrigerant, by a coating which is transparent and which is impermeable by the refrigerant. The refrigerant preferably is of a volatile character. Alcohol or any other similar volatile refrigerant may be used for the purpose of freezing the food product. The refrigerant is cooled in any well-known way, and is applied to the container for transferring the heat therefrom, preferably by immersing the container in the refrigerant. Any suitable means may be used for immersing the container for a sufficient period of time in the refrigerant, and it is not thought necessary to illustrate any specific form of apparatus for accomplishing this result. It is well known that alcohol is not injurious to the metal coated parts of a container and does not cause any resulting corroding of the container. It is further well known that the alcohol is volatile and may be quickly removed from the container after the freezing process is over by evaporation. In order that the decorated and lithographed surfaces of a container may be protected from attack by the refrigerant, applicant's first step in the process consists in the applying of a protecting coating to the container, and particularly the parts thereof which are decorated or lithographed, which protecting coating is impermeable by the refrigerant.

The metal plate forming the container is preferably decorated in sheet form by lithographing the sheets. The protecting coating may also be applied to the decorated surfaces while the metal is in sheet form. Any suitable protecting coating may be used, but it is essential that it shall be transparent and shall be impermeable by the refrigerant. One form of protecting coating which has been found very successful, is a coating in which a synthetic resin insoluble in alcohol forms the base. Such an insoluble synthetic resin is formed by the condensation of phenol with formaldehyde and is impermeable to alcohol and transparent.

The container as shown in the drawing consists of a body portion 1 having ends 2 and 3 secured thereto by double-seaming. This forms a sealed metal package in which the food product has been placed. The metal forming the body and the ends is preferably coated with tin, and is the well-known tin plate used in the making of metal containers. From certain aspects of the invention, however, other forms of coating may be used for protecting the steel plate. The metal plates are decorated while in sheet form so as to provide proper decorations for the containers. This is done by lithographing. The metal plate of the body wall is indicated at 1ª in the drawing and the lithographed coating decorating the same is indicated at 4. While the sheets are still in flat form, a protecting coating indicated at 5 is placed over the lithographed decorating coating. This coating 5 is made from the synthetic resin base and when applied to the metal parts, it produces a transparent, hard protecting coating which is impermeable by the alcohol refrigerant. The coating is preferably applied only to the lithographed or decorated faces, although all of the surfaces of the container may be covered with this protecting transparent coating.

While phenol formaldehyde synthetic resin has been referred to as a desirable base for producing this protecting coating, it will be understood that any other form of coating which is transparent and impermeable by a volatile refrigerant may be used.

By the process described above, the decorated surface of the container is protected and a volatile refrigerant can, therefore, be used, which results in a quick freezing of the food product without any injury whatever to the metal parts of the container or the decorated surfaces of the container. This refrigerant may be quickly removed from the container by evaporation after the container has been removed from the refrigerant bath.

Having thus described the invention, what I claim as new and desire to secure by Letters Patent, is—

1. The process of freezing food products in sealed metal containers having on the exterior surface thereof lithograph decorations consisting in applying over the exterior decorated surface of the container a transparent protective material impermeable by a fluid refrigerant and immersing the protected container in such fluid refrigerant for a period of time sufficient to freeze the food product in the container.

2. The process of freezing food products in sealed metal containers having on the exterior surface thereof lithograph decorations consisting in applying over the exterior decorated surface of the container a transparent phenol formaldehyde condensate, and immersing the protected container in an alcohol refrigerant for a period of time sufficient to freeze the food product in the container.

ALFRED L. KRONQUEST.